106-95 metal stearate, fatty acids, $C_6$-$C_{10}$ alcohol (aliphatic monohydric) EXAMINED 56

United States Patent Office 2,953,467 //c

Patented Sept. 20, 1960

1

2,953,467

PAINTS BASED ON PORTLAND CEMENT

Kenneth Wilson Jones, Gravesend, Kent, and Peter Joseph Jackson, Swanscombe, Kent, England, assignors to The Associated Portland Cement Manufacturers Limited, London, England, a corporation of Great Britain No Drawing. Filed Sept. 6, 1957, Ser. No. 682,284

Claims priority, application Great Britain Oct. 10, 1956

3 Claims. (Cl. 106—95)

This invention relates to improvements in compositions based on Portland cement, for example paint compositions.

It is well known that various forms of Portland cement, which may be grey or white in colour, can be used as a base for certain types of paints. Such paints or paint compositions are usually supplied in dry powder form and when mixed with water produce liquid paints which can be applied to masonry, brick, concrete, asbestos-cement sheet and like surfaces to form a decorative and protective coating.

It is also well known that a measure of water repellency and increased resistance to passage of water can be imparted to such coatings by the presence of certain water repellent materials and it is common practice to include such water repellent materials as ingredients of the dry cement base paint compositions during manufacture.

However, such paint compositions have disadvantages which limit their ease of use. Thus the incorporation of water repellent materials in dry cement base paint compositions confers some degree of water repellency on them, which makes it difficult to mix them with water. When such water repellent paint powder is added to the water the particles do not disperse easily but tend to agglomerate and to remain incompletely wetted out and the mixtures of powder and water lack the smooth creamy consistency required in a paint. To facilitate the wetting of the water repellent paint powder it is a common practice to mix the powder and water in such proportions as will produce a thick paste. The work done in stirring this thick paste provides the energy required to overcome the water repellency of the powder particles and the paste then has to be stirred with a further amount of water to obtain a paint of suitable consistency.

While this method ensures that the majority of the paint powder particles are wetted out during formation of the paste it usually involves considerable effort in mixing the paste and diluting it to a paint consistency. It is also objectionable in that the powder and water have to be measured out in the correct predetermined proportions which will produce a suitable paste.

The present invention provides improved cement base paint compositions which have greatly improved miscibility with water and disperse readily when added to water in any proportions and with gentle stirring. Furthermore the water repellency of paint coatings produced from these new paint compositions is unimpaired.

The invention is based on the discovery that the ease of wetting and dispersion in water of dry cement base paint compositions containing water repellent materials is greatly improved by the addition to the dry powder of certain alcohols. The present invention comprises a cement base powder which is free running when in the dry state and which contains water repellent material, said powder also including an aliphatic mono-hydric alcohol containing from 6 to 10 carbon atoms per molecule, or a mixture of such alcohols, in a proportion sufficient to make the powder readily wettable and dispersible in water.

2

The dry cement base compositions used in making the new paints may be such as are now commonly used and consisting of Portland cement as the main ingredient mixed with relatively small amounts of hygroscopic salts, pigments, fillers and water repellent materials. It is common practice to employ calcium or sodium chloride as hygroscopic salts. Alkali resistant pigments such as iron oxides and chromium oxide are usually used to produce the desired colour and a proportion of titanium dioxide may be added to increase the hiding power and brightness of the paint coating. Proportions of whiting, hydrated lime, and sand may also sometimes be included in such paint compositions. The water repellent materials most frequently added are fatty acid soaps such as the stearates of calcium or aluminium but other water repellents such as silicones, fatty acid esters or long chain fatty acids may also be employed.

The alcohols which are used according to the invention may be either straight chain or branched chain alcohols, and as previously indicated mixtures of alcohols may be employed. It is convenient to employ commercial mixtures of alcohols which are readily available, for example the mixture of $C_7$, $C_8$, and $C_9$ alcohols known as "Alphanol 79" and the mixture of isomeric $C_9$ alcohols known at "Nonanol," "Alphanol" being a registered trademark. Mixtures of n-hexanol with "Alphanol 79" or Nonanol may also be used.

It is well known that the degree of water repellency acquired by a dry powder cement base paint composition depends not only on the type and amount of water repellent compounds used but on the degree of dispersion of such compounds in the dry powder composition, which will depend on the manner in which the ingredients of the composition are incorporated.

The amount of $C_6$ and $C_{10}$ alcohol or mixture of alcohols which is required to carry out the provisions of the invention will vary somewhat with the degree of water repellency conferred on the dry cement base composition by the water repellent compound used and the manner of its incorporation and also with the nature of the alcohol or alcohol mixture used. For the kinds of cement composition that have been examined, the range of 0.05% to 2.0% by weight of the alcohol based on the weight of the total solid constituents of the dry composition has been found suitable. In general amounts of alcohol or alcohol mixture of from 0.1% to 1.0% by weight of the dry cement base paint composition are preferred. If too much alcohol is used the paint composition may cease to be a free running powder and objectionable oily drops of alcohol may arise on the surface of the liquid paint. If too little alcohol is used the dry powder will not have the desirable properties of easy wetting and dispersion in water which it is the main object of the invention to provide.

The invention will be further illustrated by the following examples.

*Example 1*

A dry cement base paint composition is made from the following ingredients:

| | Parts by weight |
|---|---|
| White Portland cement | 90.0 |
| Whiting | 5.5 |
| Yellow ochre (iron oxide pigment) | 0.8 |
| Calcium stearate | 0.5 |
| Calcium chloride | 3.0 |
| Nonanol | 0.1–1.0 |

In making this composition the Nonanol and other ingredients are mixed together in a ball mill. Except for the Nonanol the composition of the above example is typical of cement base paint compositions such as have hitherto been used. When the resulting powder containing the Nonanol is slowly poured into water with gentle stirring, it wets out completely and disperses to form a creamy paint. Addition of powder can be stopped when a suitable paint-like consistency is attained.

By contrast, a sample having the above composition but containing no Nonanol does not wet out and disperse but forms a suspension of large unwetted flocs of powder in the water which is quite unsuitable for use as a paint. To obtain a liquid paint from this powder 2 volumes of powder must be measured out and added to 1 volume of water. The mixture has then to be stirred for several minutes until a paste is produced which then has to be gradually thinned down with more water to a paint-like consistency.

*Example 2*

A dry cement base paint composition is made with the following ingredients mixed together in a ball mill:

| | Parts by weight |
|---|---|
| White Portland cement | 83.0 |
| Aluminium stearate | 0.5 |
| Sodium chloride | 3.0 |
| Titanium dioxide | 4.0 |
| Fine silica sand | 10.0 |
| Alphanol 79 | 0.1–1.0 |

This dry composition admixes well with water and shows the same properties and advantages referred to in Example 1.

It has also been found that these $C_6$ to $C_{10}$ alcohols may be added in the form of derivatives that are capable of being hydrolysed by the lime and alkali hydroxides contained in Portland cement to produce a $C_6$ to $C_{10}$ alcohol or mixture thereof, e.g. esters. Examples of such esters are octyl palmitate and nonyl stearate. The esters employed are hydrolysed by the basic materials in cement in the solid state during storage, and the quantity of ester used is sufficient to give in the preferred embodiment a proportion of alcohol in the range of 0.05% to 2.0%.

Different kinds of Portland cement can be used in making the new paint compositions and the scope of the invention is not limited as to the nature, amount and method of incorporation of the water repellent compound nor as to the nature, amount and method of incorporation of other well-known constituents such as cement set promoters, extenders, pigments, or sand which it has hitherto been common practice to include in dry cement base paint compositions.

What is claimed is:

1. A dry and free-running composition, consisting essentially of Portland cement and a stearate water-repellent compound for use as a paint when mixed with water and additionally containing 0.05–2.00% of a member selected from the group consisting of straight and branched chain aliphatic monohydric alcohols having 6–10 carbon atoms per molecule, including a mixture of such alcohols.

2. A composition according to claim 1, wherein the ratio of the proportions of alcohol and stearate water-repellent material present is in the range of 0.1 to 4.0.

3. A composition according to claim 1, in which the alcohol used is n-hexanol and the stearate is of a polyvalent metal having an atomic number between 13 and 20.

References Cited in the file of this patent

UNITED STATES PATENTS

| | | |
|---|---|---|
| 1,998,667 | Fritz | Apr. 23, 1935 |
| 2,238,540 | Sourwine | Apr. 15, 1941 |
| 2,313,107 | Wertz | Mar. 9, 1943 |
| 2,776,903 | Scripture | Jan. 8, 1957 |